May 4, 1954 — T. W. TURNER — 2,677,364
CHARCOAL BROILER
Filed Jan. 5, 1950 — 2 Sheets-Sheet 2
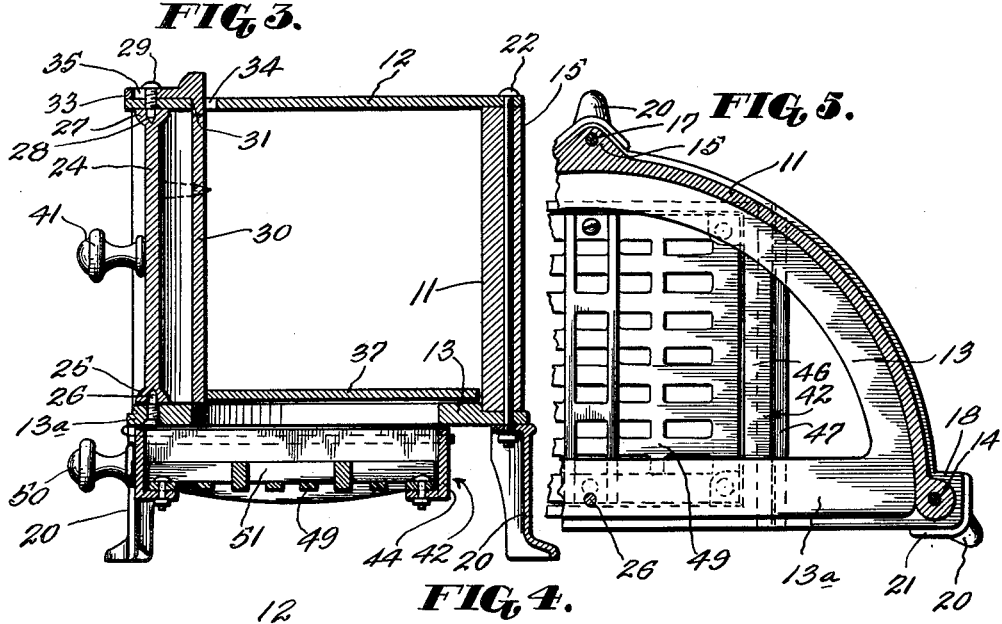
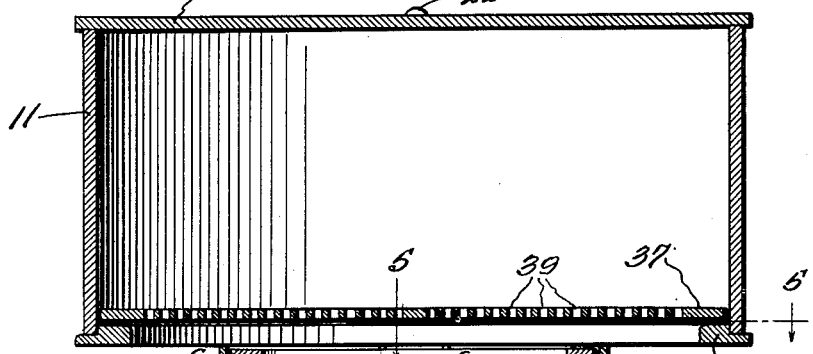
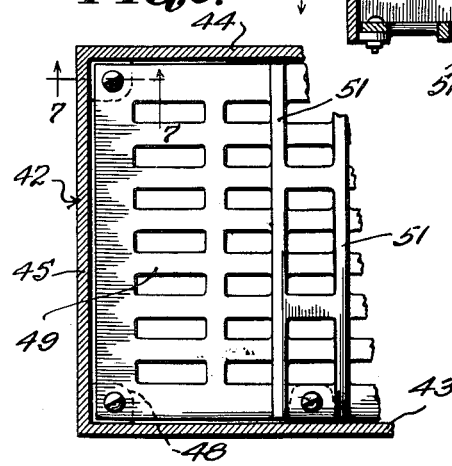
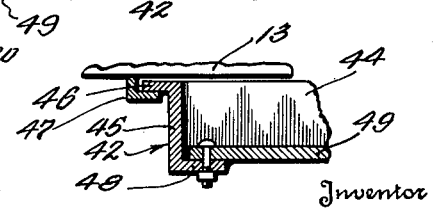
Inventor
T. W. Turner
By Wilfred E. Lawson
Attorney Patented May 4, 1954

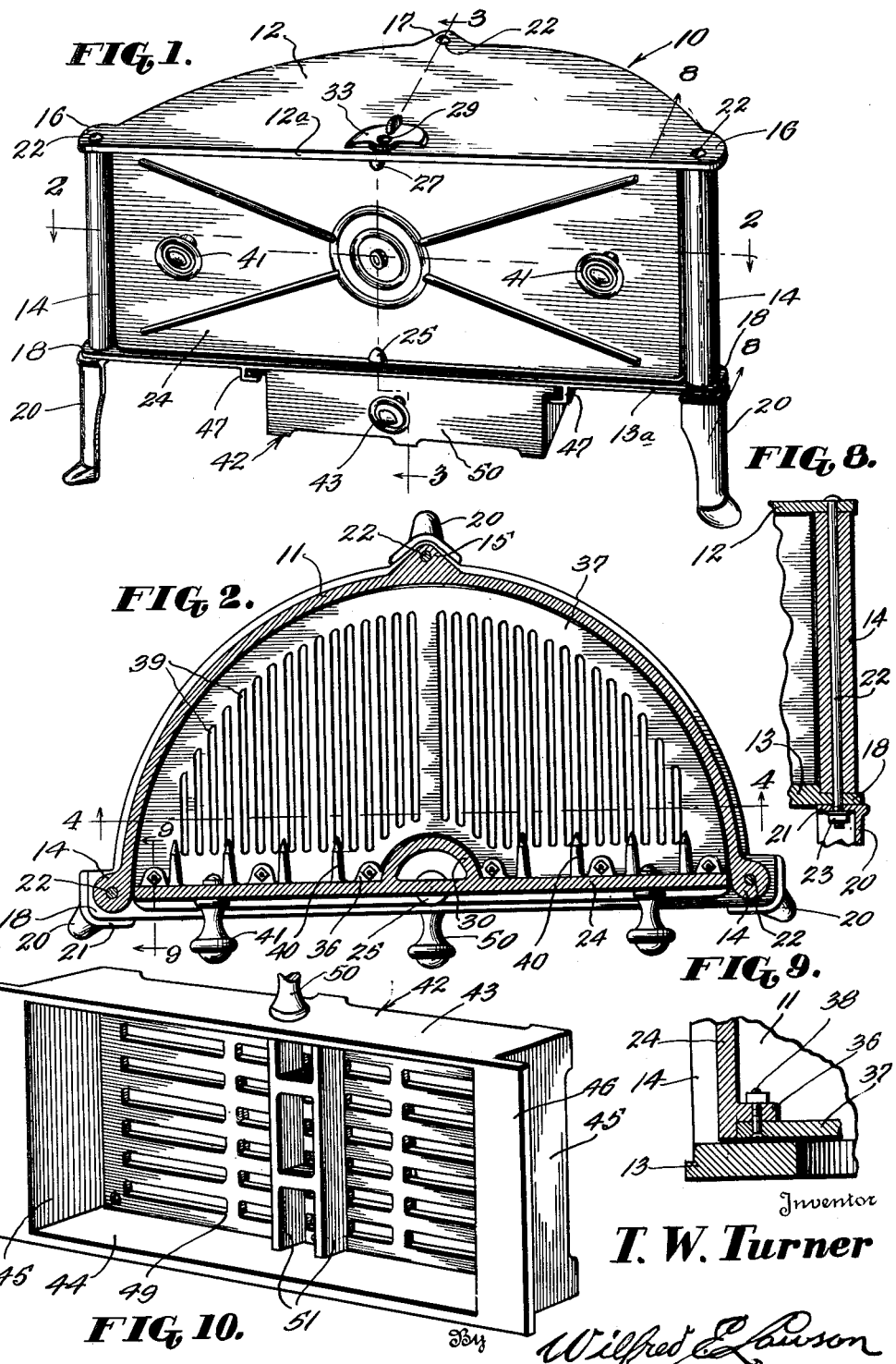

2,677,364

UNITED STATES PATENT OFFICE 2,677,364

CHARCOAL BROILER

Thomas W. Turner, Newport News, Va.

Application January 5, 1950, Serial No. 136,889

2 Claims. (Cl. 126—25)

This invention relates to cooking devices and is directed particularly to improvements in charcoal broilers.

An object of the present invention is to provide a broiler having a cooking chamber with a means for supporting a piece of meat, or other foodstuff, in such a manner that it may be easily swung into or out of the chamber and when swung out will be supported away from the burning fuel so that carving or other operations may be carried out without danger of the operator being burned.

Another object of the invention is to provide a broiler device wherein a novel means is provided for supporting the burning fuel and for facilitating the charging of the device with fuel without disturbing the cooking food and without permitting the escape of the heat from the cooking chamber.

A still further object is to provide a broiler device wherein the food carrier comprises a pivotally mounted wall of the cooking chamber with a grill carried horizontally thereby to be swung into the chamber to a position over a charcoal drawer grate, or out of the chamber to a position away from the grate.

The invention will be best understood from a consideration of the following detailed description, taken in connection with the accompanying drawings forming a part of the specification, with the understanding, however, that the invention is not to be understood as limited to the exact details of construction shown and described since obvious modifications will occur to a person skilled in the art.

In the drawings:

Figure 1 is a view in perspective of a broiler constructed in accordance with the present invention and showing the same closed.

Figure 2 is a horizontal section taken substantially on the line 2—2 of Figure 1.

Figure 3 is a vertical medial section taken substantially on the line 3—3 of Figure 1.

Figure 4 is a vertical section taken substantially on the line 4—4 of Figure 2.

Figure 5 is a partial horizontal section, on an enlarged scale, taken on the line 5—5 of Figure 4.

Figure 6 is a section taken substantially on the line 6—6 of Figure 4 on an enlarged scale.

Figure 7 is a sectional view taken substantially on the line 7—7 of Figure 6.

Figure 8 is a vertical section through a corner of the broiler taken substantially on the line 8—8 of Figure 1.

Figure 9 is a detail section taken substantially on the line 9—9 of Figure 2.

Figure 10 is a view in perspective of the fuel grate drawer.

Referring now more particularly to the drawings, the numeral 10 generally designates the body of the broiler structure which is of substantially semi-circular form and comprises an upright curved or arcuate side wall 11, a top wall 12 and a bottom 13.

The side wall 11, at each end, has the upright sleeve 14 and intermediate its ends is a corresponding sleeve 15.

The top has at each end of the straight diametrical edge 12a an apertured ear 16 which positions over the top end of a sleeve 14, and between the ends of the curved edge is a similar, apertured ear 17, which positions over the top end of the middle sleeve 15.

The bottom 13 is in the form of an open semicircular frame which conforms in outline to the curvature of the bottom edge of the wall 11 and has a straight diametrical bar 13a which is below and parallels the edge 12a. This bottom also has the two apertured ears 18, which are beneath the lower ends of the sleeves, and the intermediate ear 19, located beneath the lower end of sleeve 15.

The numeral 20 designates supporting legs, three in number, each of which has an apertured head or top plate 21. One foot is located beneath each bottom ear 18 and one beneath the central ear 19 and passing through each sleeve 14 and the sleeve 15, and also through the ears 16 and 18, and 17 and 19, respectively, and the leg plates 21, is a long tie bolt 22 having a nut 23 threaded onto its lower end and drawn up against the underside of the leg top plate. By these three tie bolts the several parts making up the body of the cooking or broiling chamber are secured together.

Disposed vertically between the ends of the arcuate wall 11, is the flat diametrical wall 24, which completes the wall structure for the chamber; it closing the open front of the body when disposed between the sleeves 14.

The wall 24 has at the center of the bottom edge, an enlargement 25 in which is fixed the downwardly projecting hinge, or pivot, pin 26 which rotatably engages in an aperture in the bar 13a of the bottom.

At the top of the wall 24, midway between the ends and in the vertical line of the pivot 26, the wall is enlarged as at 27 and provided with a tapped bore 28, in which is received a pivot screw 29 which passes through and turns in an opening in the top wall 12.

Disposed vertically across the inner face of the wall 24 is a semi-cylindrical reinforcement 30. The top edge of this member has a notch 31 therein, in which engages a tongue 32 of a flat latch plate 33 which rests upon the top of the wall 12, the tongue 32 extending down through a slot 34 in the wall 12. The plate 33 has a slot 35 through which the shank of the screw 29 passes. Thus it will be seen that the latch plate can be shifted to free the tongue 32 from the notch 31, releasing the wall 24 for turning on the vertical axis of the aligned pivots 26 and 29.

On its inner side the wall 24, at the bottom edge carries the horizontally disposed apertured lugs, and positioned against the wall below these lugs is the straight edge portion of a flat, substantially semi-circular grill plate 37. Bolts 38 pass through the lugs and the grill plate to securely fasten the latter in horizontal position.

The grill plate has a plurality of slots 39 therein, for the movement of heat upward from the underlying fuel bed and the inner face of the wall 29 carries a number of spikes 40 upon which a body of meat or the like may be impaled for broiling.

Rotation of the grill 37 and the front wall 24 on the pivots 26 and 29 may be effected by means of knobs 41 or by any other suitable means.

As will be readily apparent, when the grill and wall are normally disposed, the grill 37 will be completely within the chamber formed by the body 10, in overlying relation with respect to the inner edge portions of the frame 13, with the wall 24, as before stated, closing the open front of the body.

Fuel for broiling food carried on the grill, is burned in a drawer grate 49.

This unit 42 is rectangular in form having the front and rear walls 43 and 44 respectively, side walls 45, and a slotted bottom plate 49, constituting a grate.

At the top edge of each side wall is formed the laterally extending flange 46 which is slidably engaged on one of a pair of tracks 47 secured upon the underside of the bottom 13 to extend from the front rail 13a to the rear thereof, as shown in Figures 4 and 7.

The side walls 45 have at their bottom edges the inwardly projecting ears 48 which support horizontally the slotted grate unit 49, forming the bottom of the drawer.

The front wall of the drawer has attached thereto a knob 50, or other suitable means for facilitating the opening and closing of the drawer.

The grate bottom 49 for the drawer 42 has a pair of upstanding ribs 51 from the front to the rear thereof, upon which the starting fuel is placed to prevent smothering the fire when first lighting it.

From the foregoing it will be seen that the present invention provides a novel easily movable broiler device, which by reason of the novel rotatable grill structure will effectively conserve heat when opened for loading or removal of cooked food and wherein the fuel may be replenished at will by sliding the grate drawer in and out beneath the grill, without disturbing the grill or food.

I claim:

1. A broiler structure comprising an arcuate vertical wall, a tubular vertical sleeve extending along each end thereof, an arcuate top wall plate resting upon and concentric with said vertical wall and having apertured corner ears each alined with the top of a sleeve, an open bottom frame having a flat arcuate part partially underlying the vertical wall and a diametrical part extending across between the lower ends of the sleeves and having apertured end ears each below and alined with the adjacent sleeve, said arcuate part of the frame having a portion extending inwardly from the wall, supporting legs below said frame, two of said legs each having a flat head underlying an end ear of said diametrical part and the adjacent sleeve, a front wall disposed between said sleeves, means pivotally coupling the top and bottom edges of the front wall with the top wall and said diametrical part for turning on a vertical axis at the diametrical center of the arcuate wall, a flat semi-circular grill plate having a straight diametrical edge disposed against and secured to the inner side of the front wall at the bottom of the latter to turn with the front wall, said grill plate having the arcuate part thereof disposed over and in close proximity to the said inwardly extending portion of the opened frame, securing bolts each extending through a sleeve and through the adjacent ears of the top wall plate, the diametrical part of the frame and the flat heads of the legs and securing the parts together, an open top fuel receptacle, means for supporting the fuel receptacle from the underside of the frame in close proximity to the grate, a semi-circular reinforcing member disposed vertically and centrally upon the inner side of said front wall and concentric with said vertical axis, said member having a notch in the top thereof and said top wall having an aperture therethrough aligned with said notch, a movable latch member mounted on said top wall adjacent to said aperture, and a finger carried by said latch member and extending through said aperture for detachable engagement in said notch.

2. In a charcoal broiler, a body having a semi-circular side wall and a flat top wall, a flat open frame having an arcuate part supporting said side wall and a straight front part extending between the opposite ends of the side wall, a grill plate supported on said frame, a fuel combustion receptacle supported from the lower side of said frame and underlying a major area of said grill plate, a wall normally closing the open front of said body, pivot elements mounted in the center of the front part of said frame and of the front edge of said top wall and engaged with the top and bottom edges of the front wall to allow for turning movements of the same relatively to the body, a hollow reinforcing member mounted in the vertical center of the inner side of said front wall and having a notch in its top end, said top wall having an aperture therethrough in line with said notch, and a latch member movably mounted on said top wall and engageable with said notch through the aperture to lock the front wall in body closing position.

References Cited in the file of this patent

UNITED STATES PATENTS

| Number | Name | Date |
|---|---|---|
| 2,499 | Sayre | Mar. 23, 1842 |
| 556,706 | Stockstrom | Mar. 17, 1896 |
| 796,593 | Mohan | Aug. 8, 1905 |
| 1,171,859 | Leonard | Feb. 15, 1916 |
| 2,003,059 | Teller | May 28, 1935 |
| 2,307,914 | Bitney | Jan. 12, 1943 |

FOREIGN PATENTS

| Number | Country | Date |
|---|---|---|
| 588,872 | France | May 16, 1925 |
| 614,641 | France | Dec. 18, 1926 |
| 754,427 | France | Nov. 7, 1933 |